United States Patent Office 3,507,360
Patented Apr. 21, 1970

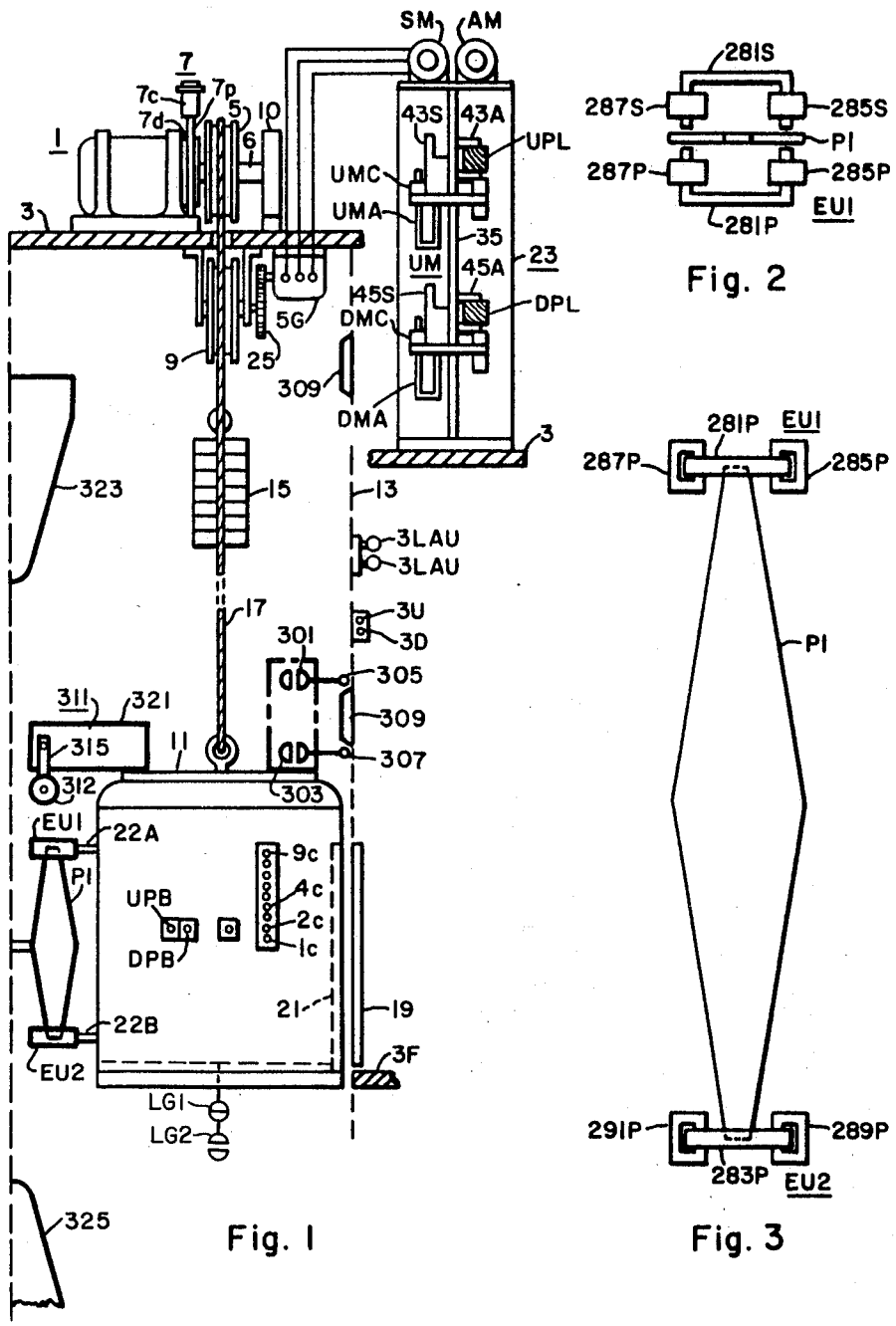

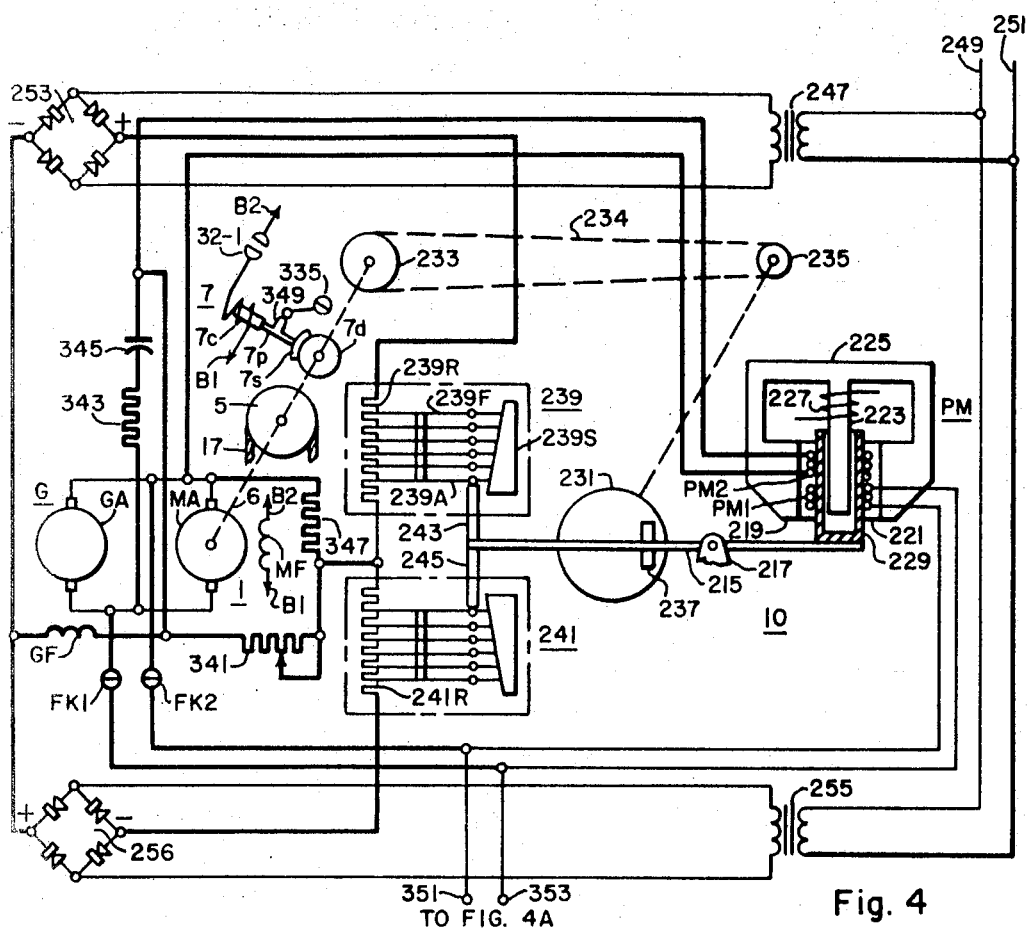
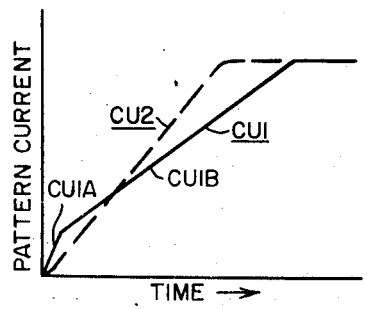
Fig. 4
Fig. 6

3,507,360
MOTOR ARRANGEMENT HAVING
ACCELERATION CONTROL
William M. Ostrander, Hackensack, and Alvin O. Lund,
Little Falls, N.J., assignors to Westinghouse Electric
Corporation, Pittsburgh, Pa., a corporation of Pennsylvania
Filed Mar. 28, 1966, Ser. No. 538,088
Int. Cl. B66b 1/24
U.S. Cl. 187—29
7 Claims

ABSTRACT OF THE DISCLOSURE

An elevator motor is energized in accordance with the difference between an acceleration pattern and the speed of the motor. The acceleration pattern is represented by a command current which is dependent on the charging of a capacitor through a resistor. This charging is proportioned to assure smooth performance of the elevator. The difference between the command current and a feedback current dependent on the rate-of-change of energization supplied to pattern reference means controls the acceleration pattern. If the elevator represents a hauling load, a small energization is supplied to the motor when the elevator is to be started for the purpose of supporting the hauling load during build up of motor energization.

This invention relates to the acceleration of motors and it has particular relation to the smooth acceleration of motors having hauling and overhauling loads.

Although aspects of the invention are desirable for various applications of motors the invention is particularly suitable for applications wherein motors are employed in operating vehicles. The invention is especially desirable for elevator systems and will be discussed with reference to an elevator system.

In an elevator system employing an electric motor a vehicle in the form of an elevator car presents a load to the motor which may be a balanced load, an overhauling load or a hauling load. Regardless of the nature of this load, the performance of the elevator system including the acceleration of the elevator car should be smooth under all conditions.

It is therefore an object of the invention to provide an improved motor arrangement having smooth performance.

It is another object of the invention to provide an improved elevator system having an elevator car which is smoothly accelerated.

It is a further object of the invention to provide an improved elevator system wherein an elevator car is smoothly accelerated under both hauling and overhauling conditions.

Other objects of the invention will be apparent from the following description taken in conjunction with the accompanying drawings, in which:

FIGURE 1 is a schematic view with parts shown in elevation, parts broken away and parts shown in cross-section of an elevator system embodying the invention;

FIG. 2 is a view in top plan of leveling apparatus suitable for the system of FIG. 1;

FIG. 3 is a view in side elevation of the leveling apparatus shown in FIG. 2;

FIGS. 4, 4A and 5 are schematic views showing control circuits in straight line form suitable for the elevator system of FIG. 1; and FIG. 6 is a graphical representation showing certain relationships between current and time which are useful in acquiring an understanding of the invention.

Figure 4A:
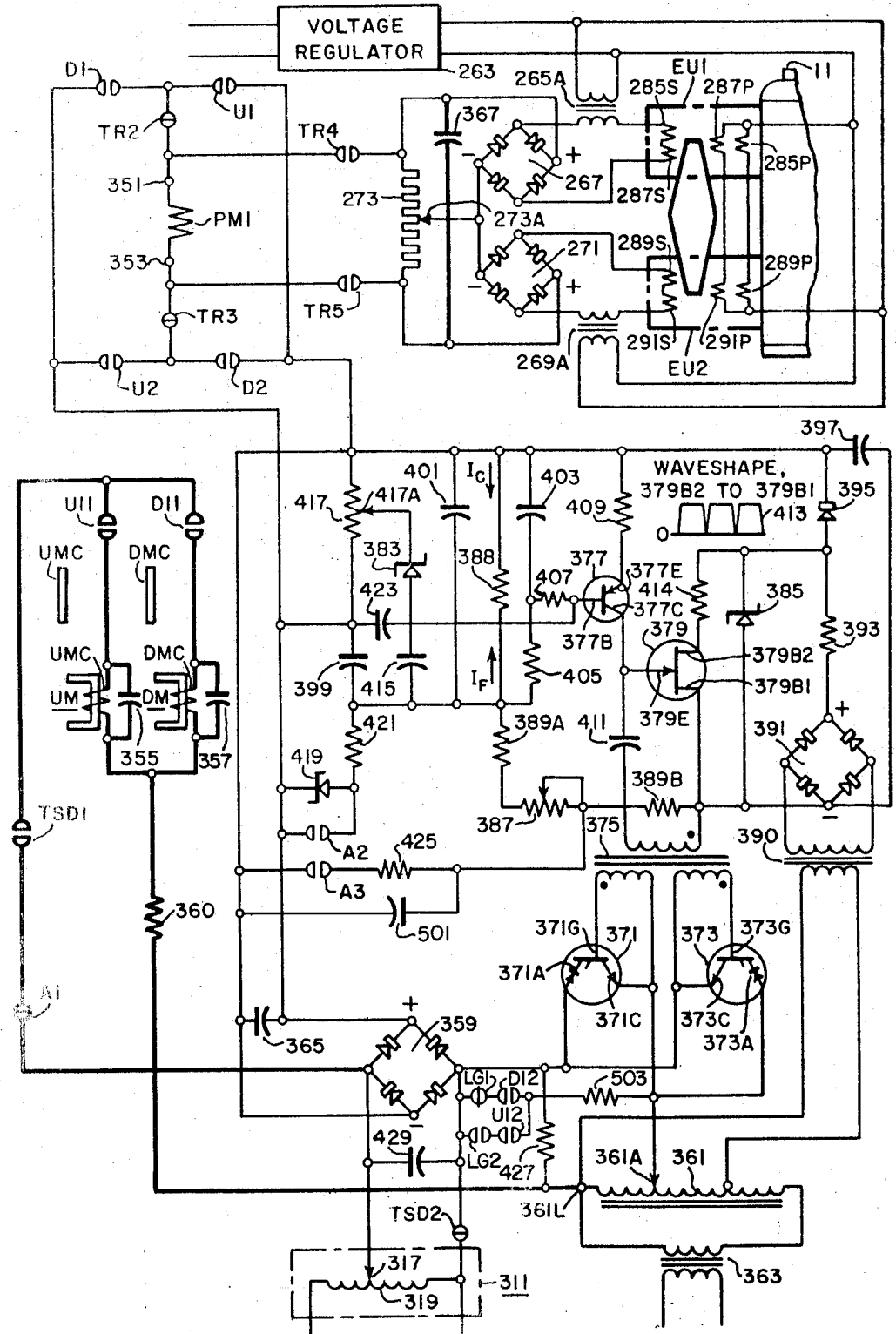
Figure 5:
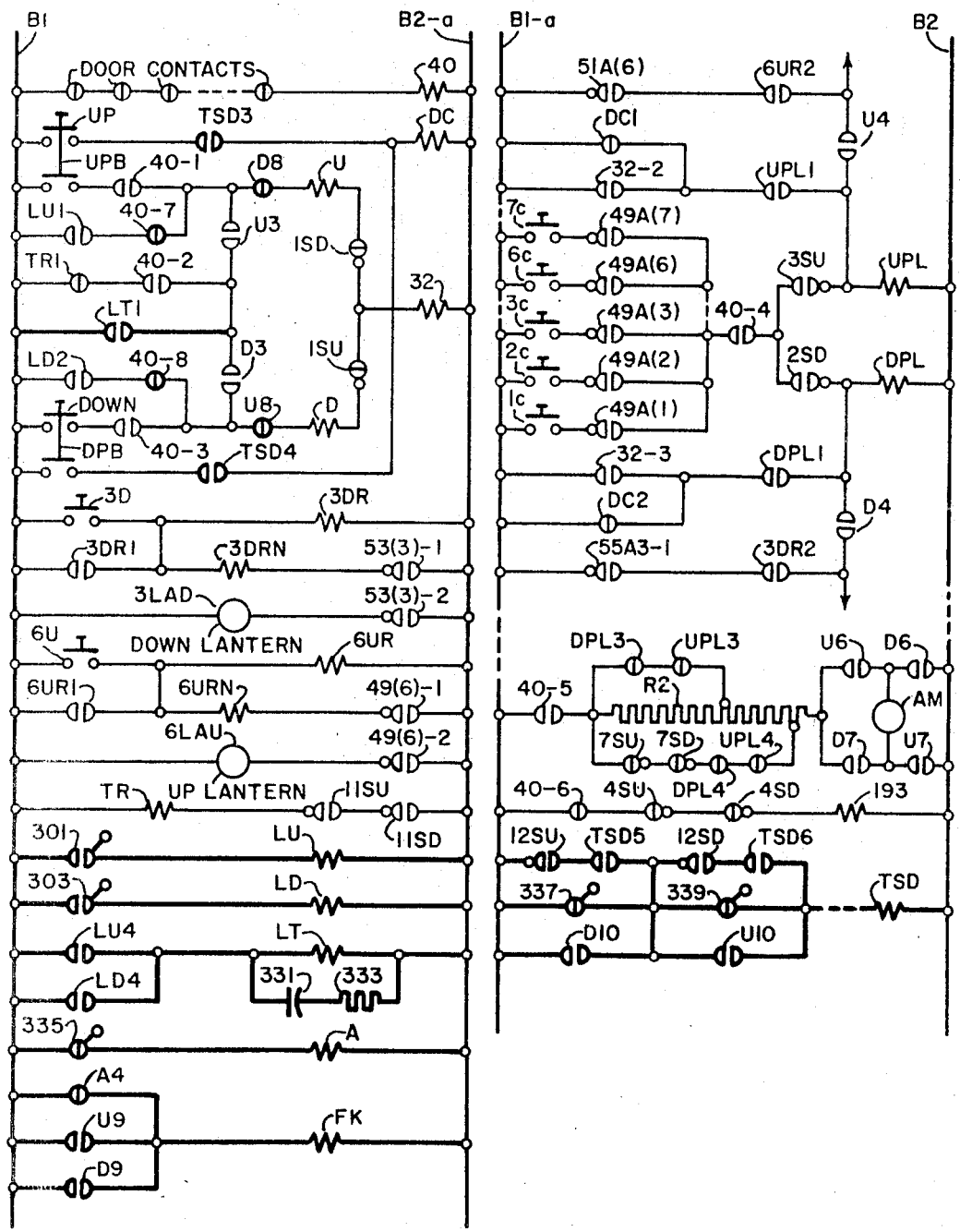

In order to simplify the presentation of the invention, it will be described as applied to an elevator system of the type shown in our Patent No. 3,207,265 which issued on Sept. 21, 1965. The conventions employed in such patent are also here employed.

Most of the components shown in the present figures are similar to components shown in our aforesaid patent. Each such component in the present drawings is identified by the same reference character employed in the patent for the same component. The following partial list of components common to the present figures and to our aforesaid patent is presented at this time:

1—elevator car motor
1c, etc.—car call push button
1LAU, etc.—up lanterns
1SU, 1SD, 3SU, 3SD, 4SU, 4SD, 7SU, 7SD, 11SU, 11SD—pile-up switches
1U, etc.—up floor call push buttons
1UR, etc.—up floor call registering relays
1URN, etc.—up floor call canceling coils
2D, etc.—down floor call push buttons
2DR, etc.—down floor call registering relays
2DRN, etc.—down floor call canceling coils
2LAD, etc.—down lanterns
10—control unit
11—Elevator car
32—car running relay
40—door relay
49, 49A, 51A, 53, 55A—pile-up switches of floor stop units
193—sprocket wheel release coil
A—acceleration relay
AM—advance motor
B1, B2, B1a, B2a—direct current buses
D—down switch
DM—down solenoid control unit
DPB—down push button
DPL—down pawl relay
EU1, EU2—electromagnetic units
FK—field control relay
G—generator
GA—generator armature
LD—down leveling relay
LT—landing time relay
LU—up leveling relay
MA—motor armature
MF—motor field
P1—inductor plate
PM1—pattern motor winding
R2—advance motor speed control resistor
SM—motor of self-synchronous drive
TR—transfer relay
TSD—terminal slow down relay
U—up switch
UM—up solenoid control unit
UPB—up push button
UPL—up pawl relay The structure of the present FIG. 1 is similar to the structure shown in FIG. 1 of our aforesaid patent except for the addition of loading contacts LG1 and LG2. These contacts are employed for distinguishing between substantially hauling and substantially overhauling loads.

It is conventional practice in the elevator art to proportion the counterweight 15 for the purpose of balancing the weight of the elevator car plus a certain percentage, such as 40%, of the rated capacity of the elevator car. Thus, if the elevator car is loaded to 40% of its capacity, a balanced load is presented to the elevator car motor 1. If the elevator car is loaded to a lesser degree, a load is presented to the elevator car motor 1 which is hauling for downward movement of the elevator car and which is overhauling for upward movement of the elevator car. If the elevator car is loaded to a greater degree, it presents a resultant load to the elevator car motor 1 which is hauling for upward travel of the elevator car and which is overhauling for downward travel of the elevator car.

It will be noted that when the elevator car is empty, the loading contacts LG1 are closed and the loading contacts LG2 are open. The contacts remain in these conditions until the load in the elevator car exceeds a balanced load, in this case 40% of rated capacity. When the loading of the elevator car exceeds the balanced load, the contacts LG1 open and the contacts LG2 close. As will be discussed below in connection with FIG. 4A these contacts are employed in applying to the elevator car motor 1 a slight energization acting to support a hauling load immediately before the car starts to accelerate.

The structures shown in FIGS. 2, 3, 4 and 5 are similar to those shown in the similarly identified figures of our aforesaid patent.

The present FIG. 4A is similar to FIG. 4A of our aforesaid patent except for certain changes which now will be discussed.

In our aforesaid patent, a resistor 425 is connected by contact A3 across resistor 388. This construction gives a high rate of change of pattern current initially which results in a high rate of acceleration just as the car is started. This high rate is useful in rapidly supporting a hauling load. However, a passenger in the elevator car is given the impression of a bump or a feeling that the car is starting rapidly after which the car settles down to the smooth desired rate of acceleration. The initial high rate of acceleration as the car is started tends to limit the application of some motor-generator sets to higher duties.

The acceleration of the elevator car of our aforesaid patent is determined by a pattern current which is represented in FIG. 6 by a full line curve CU1. The curve is plotted on Cartesian coordinates wherein ordinates represent pattern current supplied to the pattern motor winding PM1 and abcissas represent time. As it starts the car accelerates at a high rate corresponding to a steeply rising curve portion CU1A which gives a passenger the feeling of a bump. This is followed by an acceleration corresponding to a curve portion CU1B which represents a smooth rate of acceleration.

In accordance with the present invention the acceleration of the elevator car is modified to conform to the pattern current curve CU2 of FIG. 6 shown in broken lines.

As shown in the curve CU2, the start of build up of pattern current is desirably rounded or exponential to assure a smooth transition of the elevator car from standstill to acceleration at the desired rate.

In order to obtain the desired performance a resistor 389 of our aforesaid patent is here divided into two portions 389A and 389B. The resistance chain across the rectifier 391 output may be traced from the positive output terminal of the rectifier through the resistor 393, the rectifier 395 and the resistors 388, 389A, 387 and 389B to the negative output terminal of the rectifier. In addition a capacitor 501 is added and this capacitor is connected across the series resistors 388, 389A, and 387. The resistor 425 is connected between the contacts A3 and the lower terminal of the capacitor 501. Consequently, when the contacts A3 are closed, the capictor 501 is discharged through the resistor 425.

As representative of suitable parameters each of the capacitors 399, 415 and 501 may have a capacitance of the order of 100 microfarads. The resistors 421 and 425 may have resistances of the order of 100 ohms. The resistors 388, 389A, 387 and 389B may have resistances of the order respectively of 2,700 ohms, 5,000 ohms, 20,000 ohms and 5,000 ohms. The resistor 387 of course may be adjusted to provide a resistance less than the maximum of 20,000 ohms.

FIG. 4A includes filter capacitors such as the capacitors 401 and 403. These have small capacitances such as ¼ microfarad and have virtually no effect on the shape of the acceleration curve for the elevator car.

As explained in our aforesaid patent, the voltage across the error signal resistor 388 determines the input drive for the transistor 377, and is dependent on a command current $I_c$ and a feedback current $I_F$.

When the contacts A3 open for the purpose of accelerating the elevator car, the capacitors 501 has no charge. Thus, the command current $I_c$ through the error signal resistor 388 is zero initially. The command current $I_c$ in the resistor 388 will build up as the capacitor 501 is charged.

The rate at which the capacitor 501 is charged is determined by the value of capacitance of the capacitor 501 and the resistance value of the resistor 389B. Thus, the initial build up of the command current $I_c$ in the initial part of the curve CU2 is exponential. The result is a smooth increase in pattern current as clearly shown by such curve.

When the acceleration builds up in accordance with the curve CU2 of FIG. 2 a slight time elapses before the energization of the elevator car motor 1 is sufficient to support a hauling load. The movement of the elevator car as the brake is released in a direction contrary to the desired direction would be noticed by passengers of the elevator car. To avoid this undesired movement, a resistor 503 may be connected across the controlled rectifiers 371 and 373 to apply a small amount of pattern current or pre-excitation to the pattern motor winding PM1 to hold the car when starting in the hauling direction. However, such a resistor would produce a "plateau" when the elevator car is to be started in the overhauling direction.

In accordance with the invention, the resistor 503 is connected across the controlled rectifiers only when a substantial hauling load is present. As shown in FIG. 4A, the resistor is connected across the controlled rectifiers through one of two parallel circuits. One of the parallel circuits includes in series the loading contacts LG1 and make contacts D12 which are added to the down switch D. A second parallel circuit includes the loading contacts LG2 and make contacts U12 which are added to the up switch U.

If the elevator car has less than a balanced load the contacts LG1 are closed. If in addition the elevator car is to be started in the hauling or down direction, the make contacts D12 are closed. This connects the resistor 503 across the controlled rectifiers 371 and 373. The resistor is proportioned to supply a small amount of bias current to the pattern motor winding PM1. This develops a bias torque in the elevator car motor 1 sufficient to hold the hauling load when the elevator car brake is released.

If the elevator car contains a load which is larger than the balanced load, the loading contacts LG2 are closed. If such elevator car is to be started in the up or hauling direction, the make contacts U12 are closed to complete a circuit connecting the resistor 503 across the controlled rectifiers 371 and 373. Thus, the motor 1 again is energized sufficiently to hold the hauling load when the brake is released.

If the elevator car contains a load which is less that the balanced load, the loading contacts LG2 are open. If the elevator car is to be started in the overhauling direction the make contacts D12 remain open and the resistor 503 is not connected across the controlled rectifiers.

If the elevator car contains a load which is in excess of the balanced load, the loading contacts LG1 are open. If the elevator car is to be started in the overhauling direction, the make contacts U12 remain open and the resistor 503 again is not connected across the controlled rectifiers. This avoids the production of a plateau when starting the elevator car in an overhauling direction.

The loading contacts LG1 and LG2 need not change their state precisely as the car loading passes through a balanced value. For example, good results have been obtained when the change of state occurs as the car loading passes through 50% of rated capacity for an elevator car which is counterbalanced for a load equal to 40% of rated capacity. It is desirable that the resistor 503 be effective to supply pre-excitation for substantial hauling loads and that it be ineffective to provide such pre-excitation for substantial overhauling loads.

Except for the above noted changes, the elevator system herein shown may be similar to the elevator system shown in the corresponding figures of our aforesaid patent. Consequently, reference may be made to our aforesaid patent for a more detailed description of the similar components and their operation.

We claim as our invention:

1. An arrangement for providing motive power comprising a motor, pattern means for establishing an acceleration pattern to be followed by said motor, and motor energizing means coupled to said pattern means for energizing the motor in dependence on the acceleration pattern, said pattern means comprising a source of direct voltage, a first circuit including first timing capacitor means and first resistor means connecting said capacitor means across said source to be charged over periods during which the motor is to be accelerated, pattern-reference means for establishing an acceleration pattern for said motor dependent on energization of the pattern-reference means, and energizing means for energizing said pattern-reference means in accordance with the voltage of a part of the first circuit which is dependent on the charging of said capacitor to produce an acceleration pattern relative to time which initially is slightly rounded to provide a smooth transition from motor standstill to motor accelerating in combination with load means operable into a first condition in response to a substantially hauling load for said motor and into a second condition in response to a substantially overhauling load for said motor, and bias means responsive to said first condition of the load means when the motor is substantially at rest for supplying a small energization to said motor in a direction acting to oppose movement of the motor by the hauling load.

2. An arrangement for providing motive power comprising a motor, pattern means for establishing an acceleration pattern to be followed by said motor, and motor energizing means coupled to said pattern means for energizing the motor in dependence on the acceleration pattern, said pattern means comprising a source of direct voltage, a first circuit including first timing capacitor means and first resistor means connecting said capacitor means across said source to be charged over periods during which the motor is to be accelerated, pattern-reference means for establishing an acceleration pattern for said motor dependent on energization of the pattern-reference means, and energizing means for energizing said pattern-reference means in accordance with the voltage of a part of the first circuit which is dependent on the charging of said capacitor to produce an acceleration pattern relative to time which initially is slightly rounded to provide a smooth transition from motor standstill to motor accelerating wherein said pattern means comprises means for deriving a command current dependent on the charge of said capacitor means, means for deriving a feedback current dependent on the rate-of-change of energization supplied to said pattern reference means, and means for energizing the pattern reference means in accordance with a joint function of the command current and the feedback current, said motor-energizing means comprising means for energizing the motor in dependence on the difference between the acceleration pattern and the speed of the motor.

3. An arrangement as claimed in claim 2 in combination with a structure having vertically-spaced landings, an elevator car, means for mounting the elevator car for vertical movement by said motor relative to said structure in up and down directions, said elevator car presenting a hauling load to said motor under certain conditions and an overhauling load to the motor under certain conditions, means for stopping the elevator car at a landing of the structure and thereafter controlling the motor-energizing means to accelerate the elevator car away from said landing in a preselected direction, load means operable into a first condition in response to a substantially hauling load for said motor and into a second condition in response to a substantially overhauling load for said motor, and bias means responsive to said first condition of the load means when the motor is substantially at rest for supplying a small energization to said motor in a direction acting to oppose movement of the motor by the hauling load, said last named means in the presence of said second condition being ineffective to supply said small energization to the motor.

4. An arrangement as claimed in claim 3 wherein the mounting means comprises counterweight means balancing the elevator car when carrying a predetermined balanced load intermediate zero and rated capacity, said load means comprising load-measuring means having a first state when the load in the elevator car is substantially larger than said balanced load and a second state when the load in the elevator car is substantially less than said balanced load, directional means having a third state when the elevator car is set for up travel and a fourth state when the elevator car is set for down travel, said bias means being controlled to supply said small energization when the load-measuring means and the directional means occupy the first and third states respectively, said bias means being controlled to supply said small energization when the load-measuring means and the directional means occupy the second and fourth states respectively, said bias means being ineffective to supply said small energization when the load-measuring means and the directional means occupy the second and third states respectively and when they occupy the first and fourth states respectively.

5. An arrangement for providing motive power comprising motor load means operable into a first condition in response to a substantially hauling load for said motor and into a second condition for a substantially overhauling load for said motor, and bias means responsive to the first condition of the load means when the motor is substantially at rest for supplying a small energization to said motor in a direction acting to oppose movement of the motor by the hauling load.

6. An arrangement as claimed in claim 5 in combination with a structure having landings, an elevator car, means mounting the elevator car for vertical movement by said motor relative to the structure in up and down directions to serve said landings, said elevator car presenting a hauling load to said motor under certain conditions and an overhauling load to the motor under certain conditions, means for stopping the elevator car at a landing of the structure and thereafter energizing the motor to accelerate the motor away from the landing in a preselected direction, said bias means in the presence of said first condition operating to supply said small energization to the motor prior to acceleration of the elevator car away from a landing at which it is stopped.

7. An arrangement as claimed in claim 6 wherein the mounting means comprises counterweight means balancing the elevator car when carrying a predetermined balanced load intermediate zero and rated capacity, said load means comprising load-measuring means having a first state when the load in the elevator car is substantially larger than said balanced load and a second state when the load in the elevator car is substantially less than said balanced load, directional means having a third state when the elevator car is set for up travel and a fourth state when the elevator car is set for down travel, said bias means being controlled to supply said small energization when the load-measuring means and the directional means occupy the first and third states respectively, said bias means being controlled to supply said small energization when the load-measuring means and the directional means occupy the second and fourth states respectively, said bias means being ineffective to supply said small energization when the load-measuring means and the directional means occupy the second and third states respectively and when they occupy the first and fourth states respectively.

References Cited

UNITED STATES PATENTS 3,350,612  10/1967  Hansen et al. _____ 318—143

ORIS L. RADER, Primary Examiner

W. E. DUNCANSON, JR., Assistant Examiner